UNITED STATES PATENT OFFICE.

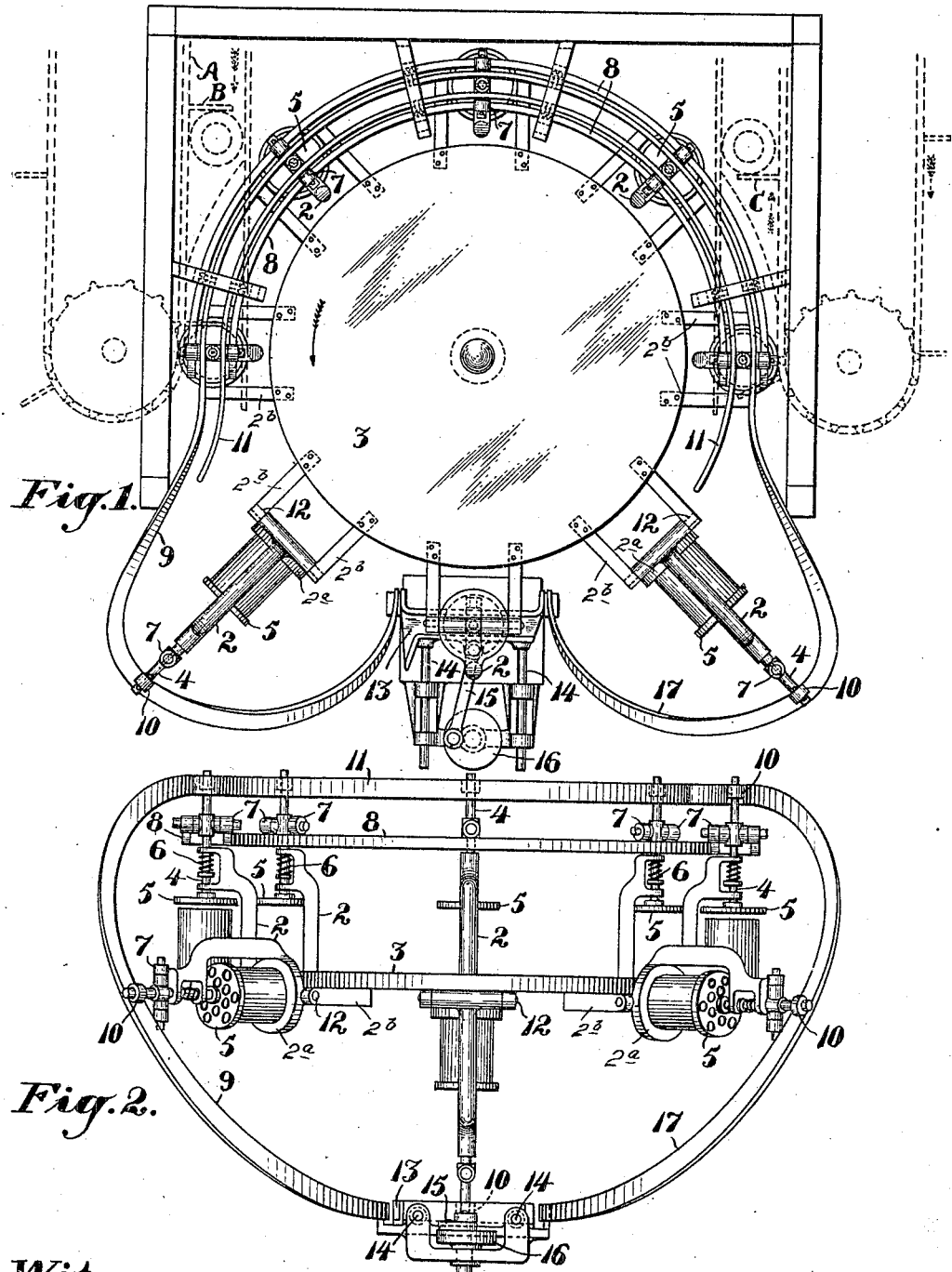

LOZELLE F. GRAHAM, OF SAN JOSE, CALIFORNIA.

FRUIT-WASHING MACHINE.

No. 837,559. Specification of Letters Patent. Patented Dec. 4, 1906.

Application filed November 6, 1905. Serial No. 286,023.

*To all whom it may concern:*

Be it known that I, LOZELLE F. GRAHAM, a citizen of the United States, residing at San Jose, in the county of Santa Clara and State of California, have invented new and useful Improvements in Fruit-Washing Machines, of which the following is a specification.

My invention relates to an apparatus which is designed for washing fruit after it has been placed in cans in readiness for sealing and other operations necessary to complete the process.

It consists in the combination of mechanism and in details of construction which will be more fully explained by reference to the accompanying drawings, in which—

Figure 1 is a plan view illustrating my invention. Fig. 2 is a front elevation.

After fruit has been properly prepared and placed in cans preparatory to filling the cans with syrup and finally sealing them it is desirable to thoroughly cleanse the fruit before adding the syrup.

It is the object of my present invention to provide an automatically-operating apparatus for this purpose, and in the present drawings I have only illustrated such operations of the apparatus as are necessary for this purpose.

The cans containing the fruit are placed upon a suitable and well-known form of runway (not shown) and are propelled by a traveling belt having arms B extending behind the cans to move them along until they arrive at the present apparatus. Means not here shown are provided for filling the cans with water before they arrive at the present machine. They are thus prepared for the operation which is to take place in this machine.

Arms or standards 2 have their upper and outer ends formed to guide the slidable spring-pressed shafts or stems 4, upon the inner ends of which are fixed the perforated disks 5. The inner ends of the standards 2 have disks or plates 2ª, which are journaled at 12 in bars or supports 2ᵇ, the inner ends of which are riveted or secured to the edge of the disk 3. This allows the standards and the parts movable therewith to be tilted or oscillated, as will be hereinafter described. The disks at the inner ends of the standards serve as supports for the cans, which are carried forward upon the belt A and are moved in unison with the revolutions of the disk 3 so that as each can arrives in line with a disk 2ª it will be deposited thereon as the belt descends around the drum on its return movement and will thereafter be subject to the movements of the revoluble carrier 3.

The disks 5 are normally held up by rollers 7 until the cans are delivered in position beneath said disks. These rollers are carried by the vertical shafts 4 and travel upon tracks 8, which hold them up, and with them the disks 5, until in passing around the curved tracks 8 the disks and cans are brought to coincide. At this point the tracks 8 incline downward or terminate so that the rollers leave the track, and the springs 6 are allowed to act upon the disks and their shafts and force the disks down upon the top of the cans.

9 is a downwardly-curved track, and 10 represents rollers carried upon the upper ends of the shafts 4 so as to contact with this track. While passing around that portion of the segmental curve in which the disks are held up by the rollers 7, as previously described, the rollers 10 travel between the curved guide 9 and a guide 11; but this latter guide terminates at such a point that the rollers 10 will afterward follow the track 9 by gravitation.

The standards 2, by which the rollers are supported, have transverse journal-shafts, as at 12, about which they are allowed to turn freely, so that after a disk 5 has been pressed down upon the can to retain its contents the roller 10 will follow the curved guide 9 by gravitation, the journal-shaft 12 allowing the can and supporting-standard to turn as the roller follows the guide. As the can becomes inverted the water within it runs out through the holes in the disk 5, and when the can has arrived at the lowermost point the roller 10 enters a transverse guide 13. This guide is slidable upon rods 14, and by means of a connecting-rod 15 from a crank-shaft 16 guide 13 is caused to oscillate, carrying with it the can in its inverted position, as plainly shown in Fig. 1. The repeated oscillation thus produced shakes the can and most all of the water within it is shaken out, and by the action of the shaken water impurities of any kind will be discharged, leaving the fruit in a condition for the application of the syrup.

The continued movement of the parts carries the roller 10 through the guide 13, and it then contacts with another curved guide 17, similar to the one previously described and shown at 9. This guide 17 acts upon the roller 10 and again brings it and the can into a vertical position, and when it has arrived in this position the rollers 7 are received upon the opposite ends of the segmental guides 8 and are raised together with the stem 4 and the disk 5, thus leaving the can again free from the disk. At this instant the can is delivered upon a carrier or support and in line with the projecting arms C, which are driven at such a rate of speed as to meet each can as it is delivered from this apparatus and to convey it away for further operation.

Having thus described my invention, what I claim, and desire to secure by Letters Patent, is—

1. An apparatus for washing fruit in cans, said apparatus comprising a tiltable carrier in which the cans are clamped, substantially oppositely disposed guides upon which the free end of the tiltable carrier is supported and by which the cans are inverted during their travel, and the cans restored to an upright position.

2. In an apparatus for washing fruit tiltable holders to which the cans are delivered after being filled with fruit, perforated disks forming closures for the cans, means by which said disks are pressed upon the tops of the cans to retain their contents, descending guides over which the free ends of the can-holders are movable so as to invert the cans and discharge the water through the disk perforations, and ascending guides by which the can-holders are again turned to restore the cans to a vertical position.

3. An apparatus for washing fruit in cans, said apparatus comprising turnable standards, and means by which they are revolved around a common center, said standards being adapted to receive the cans after being filled, spring-pressed disks carried by the standards and acting to close the open ends of the can, rollers carried by the standards, curved guides over which said rollers travel during the revolution of the carrier whereby the cans are inverted and the water discharged therefrom, other guides by which the cans are again restored to their upright positions, and means by which the disks are lifted and the cans left free to be removed from the apparatus.

4. The combination of a carrier, a tiltable can-supporting standard, a shaft sliding therein, and provided with a disk at one end, and arms carrying rollers, a spring for actuating said shaft, and tracks on which said rollers travel, said tracks being adapted to retain said standard, shaft, and disk in a raised position until the can is delivered in position beneath the disk, and then to release them to be depressed by the spring.

5. The combination of a carrier, a tiltable can-supporting standard, a shaft sliding therein, and provided with a perforated disk at one end, said standard carrying rollers, tracks upon which the rollers travel, said tracks being adapted to retain the standard, shaft, and disk in a raised position until the can is delivered in position beneath the disk, and then to release them to be depressed by the spring, a curved guide over which the free end of the standard travels, a shaking mechanism to which the guide delivers the can, and a second guide to which the cans are delivered from the shaking mechanism, and by which the can is restored to an upright position.

6. An apparatus for washing fruit having in combination can-carrying mechanism adapted to engage a can when the latter is in an upright position; means whereby the can is tilted from its upright position and caused to assume an inverted position; means for imparting a positive shaking movement to the can while said can is inverted; and means succeeding the shaking mechanism for righting the can to cause it to again assume its upright position.

In testimony whereof I have hereunto set my hand in presence of two subscribing witnesses.

LOZELLE F. GRAHAM.

Witnesses:
S. H. NOURSE,
D. B. RICHARDS.